UNITED STATES PATENT OFFICE.

ERNST SIMONS, OF CASSEL, GERMANY.

METHOD OF PREPARING LEGUMES FOR THE MANUFACTURE OF DOUGH OR FLOUR FOR BREAD AND BAKERS' WARES.

1,225,878.   Specification of Letters Patent.   Patented May 15, 1917.

No Drawing.   Application filed September 22, 1915. Serial No. 52,131.

*To all whom it may concern:*

Be it known that I, ERNST SIMONS, a subject of the German Emperor, and a resident of Cassel, Germany, have invented a new and useful Method of Preparing Legumes for the Manufacture of Dough or Flour for Bread and Bakers' Wares, of which the following is a specification.

Legumes have been disintegrated by treating them with water or steam of a temperature of 100° C. but the result consisted not only in destroying the gluten, and the vitamin but also in rendering the diastase inactive. To preserve the latter and the vitamin, legumes might be treated with water of a temperature of less than 100° C., for instance 75° or 85° C., but then valuable properties of legumes *i. e.* the aromatic scents, would be lost, although they ought to be preserved in order to show clearly if the legumes be good. Through the smell is to be ascertained whether there has been too strong a manuring of the soil on which the legumes are grown.

These scents would, in fact, become lost partly by way of the scum and slime, forming upon the mixture of the water and the said products and being removed in proper time, partly in and by the liquid, which cannot be completely made use of.

The drawbacks in question are fully obviated by employing steam of less than 100° C., for instance 75° or 85° C.; this of course, must be done in a vacuum receptacle in which the pressure inherent with said temperature is kept uniform. To accelerate the process, substances adapted to act upon the cellulose of the husks or hulls and to soften or mollify the same may be employed in combination with the application of steam of reduced pressure. Besides the advantages already disclosed, my improved and novel method excels the previous methods also in the following points:

(1) The vitamin is not destroyed;
(2) The germinative faculty is preserved;
(3) The gluten is not destroyed; and
(4) The aromatic cerealic scents are preserved also. It might be assumed that the scum and slime formed also under the partial vacuum also contain valuable nutritive salts, but this is, in fact, not the case. Suppose, the legumes are treated for at least 5 hours with steam of 85° C. under a partial vacuum at a pressure of 436.5 millimeters, the scum and slime being removed in proper time, the said products become so soft that they may be crushed without any difficulty. To prove, that the above mentioned qualities, especially the germinative faculty, are preserved, the following test was performed.

After a digestion of the last mentioned crushed product during two hours at 55° C. a solution is obtained which strongly reduces Fehling's solution and deviates the polarized ray of light to the right. Accordingly the diastase is obtained.

The thus prepared legumes are crushed and then used for making dough or they are dried in known manner and are then reduced to flour. During the drying the temperature employed may be raised to some extent but not so far as to destroy the vitamin or to produce other noxious effects. If desired or preferred, oxygen may be admitted at the same time to improve the product.

The flour produced from the products treated in the before-described manner does not contain any bitter substances and may be used for feeding or baking purposes either alone or in combination with other kinds of flour. It has a fine yellowish color and is distinguished by this property from all other kinds of flour employed for bakery purposes. Also the bread produced from this flour or from a mixture of flours containing the flour in question shows the just mentioned color. If bleaching substances, such, for instance, as ozone, hydric peroxid, or the like, are employed during the opening or disintegrating of legumes, the flour has a somewhat lighter color; however, the tendency to get moldy or musty (which is chiefly caused by the flour taking up a rather large quantity of water during the baking operation) is greatly reduced.

A particularly well-tasting bread is obtained by mixing one part of rye malt dough with two parts of dough produced from flour made from legumes prepared according to the before-described novel method, adding some yeast and salt to the mixed dough and baking the whole for from 12 to 13 hours in a tight oven under the influence of heat and steam.

Having now described my invention, what I desire to secure by Letters Patent of the United States is:

1. The method of preparing legumes for the manufacture of dough or flour for bread and bakers' wares, consisting in subjecting said legumes to the action of steam of less than 100° C. in order to preserve the diastase, substantially as described.

2. The method of preparing legumes for the manufacture of dough or flour for bread and bakers' wares, consisting in subjecting said legumes to the action of steam of less than 100° C. in order to preserve the diastase, and then drying and crushing said legumes, substantially as described.

In testimony whereof I have signed my name to this specification in the presence of two subscribing witnesses.

ERNST SIMONS.

Witnesses:
   ARNO HEDERICH,
   ELISE STRUTWOLF.